United States Patent [19]

Bertsch

[11] Patent Number: 4,574,591

[45] Date of Patent: Mar. 11, 1986

[54] CLEARANCE SEALS AND PISTON FOR CRYOGENIC REFRIGERATOR COMPRESSORS

[75] Inventor: Peter K. Bertsch, Pepperell, Mass.

[73] Assignee: Helix Technology Corporation, Waltham, Mass.

[21] Appl. No.: 527,215

[22] Filed: Aug. 29, 1983

[51] Int. Cl.[4] .............................................. F25B 9/00
[52] U.S. Cl. ..................................... 62/6; 60/520; 92/170; 92/171
[58] Field of Search ............................ 62/6; 60/520; 277/DIG. 6; 92/170, 171

[56] References Cited

U.S. PATENT DOCUMENTS

| | | |
|---|---|---|
| 2,678,247 | 5/1954 | Geyer et al. |
| 3,877,239 | 4/1975 | Leo ............................................ 62/6 |
| 3,928,974 | 12/1975 | Benson. |
| 3,958,841 | 5/1976 | Braun. |
| 4,197,787 | 4/1980 | Schneider. |

Primary Examiner—Ronald C. Capossela
Attorney, Agent, or Firm—Hamilton, Brook, Smith & Reynolds

[57] ABSTRACT

A cermet piston 36 is positioned to reciprocate within a ceramic sleeve 58 of a cryogenic refrigerator 12. The sleeve 58 forms a very tight clearance seal 67 with the piston 36 yet is allowed to float within a large gap 66 between piston housing 35 and the sleeve. The gap 66 allows the sleeve 66 to compensate for misalignment or distortions of the piston housing 35. Elastic seals 68, 70 prevent gas blow-by between the working space 18 of the piston 36 and the piston's dead space 19. The piston is connected to a motor drive mechanism through connecting rod 44 and helium lubricated wrist pin 48.

12 Claims, 4 Drawing Figures 4,574,591

CLEARANCE SEALS AND PISTON FOR CRYOGENIC REFRIGERATOR COMPRESSORS

FIELD OF THE INVENTION

This invention relates to cryogenic refrigeration systems and particularly to reciprocating compressor pistons used therein.

BACKGROUND OF THE INVENTION

A Stirling cycle cryogenic refrigerator includes a compressor with a reciprocating piston. The reciprocating piston provides a near sinusoidal variation in the pressure of a working fluid. This working fluid fills a volume which includes the head space above the compressor piston and internal voids in a refrigerator cold finger. In the case of a split Stirling system, the working volume also includes a gas line interconnecting the compressor and the cold finger. Within the cold finger, a displacer moves in timed relationship with the sinusoidal pressure variations of the working fluid to provide cooling at one end of the cold finger.

Typically, Stirling cycle refrigerators include an electric motor driven compressor, and the invention will be described with reference to split Stirling cycle refrigerators of that type. In prior art compressors the dynamic seal about the compressor piston has generally been an annular lip or a split ring seal.

One problem encountered when such compressors are used in split Stirling systems is leakage, past the dynamic seal, between the reciprocating piston and its surrounding housing. This leakage results in gas flow between the working volume at the headspace of the piston and a control volume or dead space to the rear of the piston. Where there is greater leakage in one direction than in the other during reciprocation of the piston, the mean pressure of the working fluid tends to rise or fall. Typically, refrigerators are designed about a certain designated mean pressure of working fluid. Therefore, as the seals deteriorate with compressor usage and the mean pressure of working fluid changes, a drop in refrigerator efficiency occurs. This drop in efficiency results in high energy usage and lower refrigerator capacity.

More recently, compressors of this type have been designed with clearance seals, which are more resistant to wear and therefore have a longer life than seal rings. Further, such clearance seals are less likely than seal rings to inject contaminates into the working fluid that might degrade refrigerator performance. An example of this type of seal may be found in U.S. application Ser. No. 487,513 filed Apr. 22, 1983 by Noel Holland, now abandoned.

An object of this invention is to provide the compressor for a Stirling refrigeration system with improved clearance seals. In addition, it is an object that these clearance seals be easy to manufacture and resistant to problems associated with distortion of the cylinder head.

SUMMARY OF THE INVENTION

The invention comprises a cryogenic refrigerator wherein a sleeve is positioned to float within a piston housing. The sleeve is comprised of ceramic and is subject to a substantial gas pressure variation at one end, while gas pressure is relatively constant at the other end of the sleeve. A piston which is positioned to reciprocate within the sleeve is also comprised of ceramic material.

The ceramic sleeve may be retained within the piston by several means including a snap ring or a shoulder on the housing or the sleeve.

The piston is tightly positioned within the sleeve so that its outer diameter is within 0.005 inches of the inner diameter of the sleeve. However, the sleeve is much more loosely positioned within the piston housing so that it can float and in that way compensate for misalignments or distortions of the piston housing. Elastic seals prevent gas blow-by between the sleeve and the piston housing.

In the preferred embodiment of the invention the ceramic material of the piston is cermet and is somewhat softer than the ceramic material of the sleeve.

In the preferred embodiment of the invention having a two piece piston housing, one of such housings is substantially closed so that it forms with the piston a compression workspace for gas. The other housing is open to allow connection of the piston to drive means. This drive means is preferably a connecting rod from an electric motor which is connected to the piston through a ceramic wristpin, the wristpin forming a bearing with the piston and being lubricated by the refrigerant gas of the cryogenic refrigerator.

BRIEF DESCRIPTION OF THE DRAWINGS

The foregoing and other objects, features, and advantages of the invention will be apparent in the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
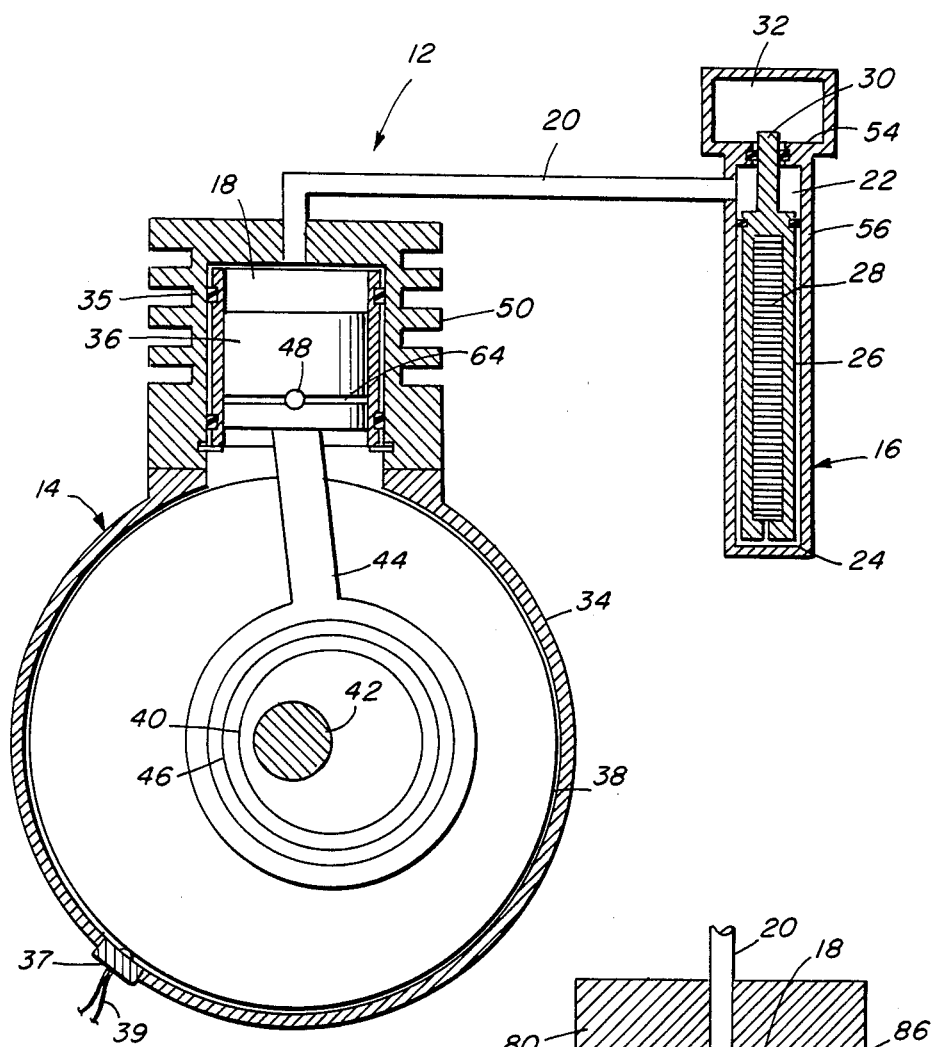
FIG. 1 is a schematic of a split Stirling cycle refrigerator system embodying the present invention.

A split Stirling cycle refrigeration system 12 is shown in FIG. 1. This system includes a reciprocating compressor 14 and a cold finger 16. The compressor produces a sinusoidal pressure variation in a volume 18 of pressurized refrigerant gas. That pressure variation is transmitted through supply line 20 to the cold finger 16.

The cold finger 16 comprises a cylindrical displacer or piston element 26. The displacer is free to move upward or downward and to thereby change the volumes of a warm space 22 and cold space 24. Displacer 26 houses a regenerative heat exchanger 28 which in this case is comprised of several hundred finely meshed copper screen discs stacked to form a cylindrical matrix. Other common regenerators utilize stacked balls instead of discs. Helium refrigerant gas flows through the refrigerator between the warm space and the cold space. A piston extension 30 extends upward from displacer 28 to the gas spring volume 32 at the warm end of the cold finger.

The compressor 14 comprises a gas tight housing 34 which encloses a reciprocating piston 36. The piston 36 is driven through a crank mechanism from an electric motor 38. The crank mechanism comprises a crank cam 40 affixed to a motor shaft 42 and a connecting rod 44. The connecting rod 44 is driven by the cam through a bearing 46 which is here formed by two close fitting ceramic sleeves. The connecting rod, or arm, 44 in turn drives the piston 36 through wrist pin 48. Electrical power is provided to the motor 38 from electrical leads 39 which pass through a fused ceramic connector 37. Heat generated by the compressor is radiated to ambient air by heat dissipating fins 50 surrounding the compressor cylinder.

The refrigerator shown in FIG. 1 can be seen as including three isolated volumes of pressurized refrigerant gas. The crankcase housing 34 is hermetically sealed and contains a control volume, or dead volume, of pressurized gas below the piston 36. The piston acts on that control volume as well as the working volume of gas in space 18. The working volume of gas comprises the gas in the head space 18, supply line 20 and cold finger 16. The cold finger itself includes the warm space 22, cold space 24 and the voids within the regenerator 28.

The third volume of gas in the compressor is the gas spring volume 32. This volume of gas is sealed from the cold finger working volumes by seal 54 which surrounds the regenerator piston extension 30. A conventional piston seal 54 is shown but other seal arrangements may be used such as those described in co-pending U.S. patent application Ser. No. 241,418 filed Mar. 28, 1980 by Noel Holland.

Figure 2:
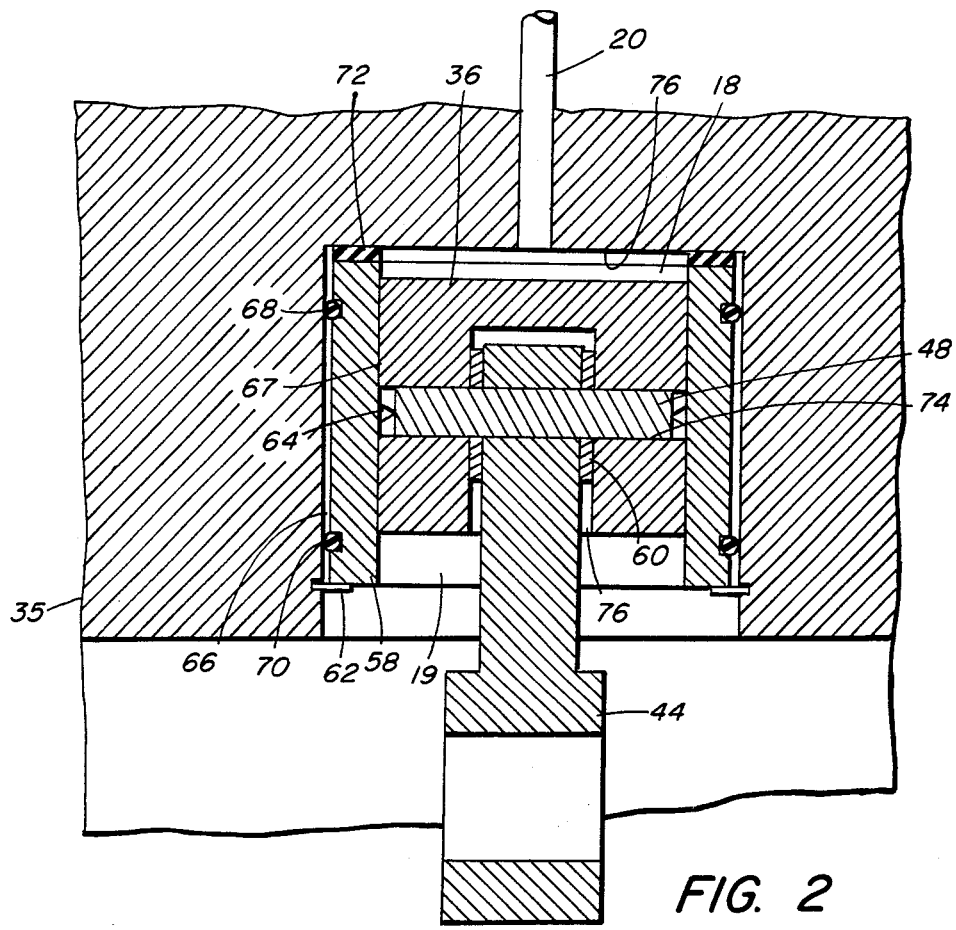
FIG. 2 is a cross section of the compressor piston of FIG. 1 and the cylinder head surrounding it.

FIG. 2 is an expanded cross section of the compressor of FIG. 1. This view of the compressor is rotated 90° from FIG. 1. The compressor of FIGS. 1 and 2 incorporates floating ceramic sleeves which permit piston operation with a very tight clearance seal 67 over a wide variety of temperatures.

The piston 36 is constructed of cermet or ceramic and reciprocates within a ceramic sleeve 58. The outer diameter of the piston is nearly the same as the inner diameter of the sleeve 58 and radial clearances between the two surfaces are as small as $2 \times 10^{-6}$ inches. A floating sleeve arrangement is utilized to allow the piston to freely reciprocate in such confinement without binding. Snap ring 62 maintains sleeve 58 in its axial position, although the sleeve is permitted to shift from side to side against elastomeric seals 68 and 70. A relatively large radial clearance 66 of about $1 \times 10^{-3}$ inches is provided between the aluminum cylinder head 35 and the sleeve 58.

The piston and the sleeve are constructed of ceramic or cermet material to minimize wear and to provide smooth bearing surfaces. The hardness of these surfaces should be at least 60 on the Rockwell C scale and is preferably over 70 on the C scale. Abrasion resistance is such that the wear rate of the two close fitting moving parts is less than one micro inch per hour. This is when the parts have a surface finish of better than 16 micro inches. Additionally the gas refrigerant fills the small gap between the piston and the sleeve to provide lubrication to lessen the wear.

Cermets are materials comprising ceramic particles bonded with metal. Typically, ceramics include compounds of metals or metal-like materials in groups 2, 3 or 4 of the periodic table combined with a non-metallic element. Typically, the non-metallic element would be carbon, silicon or boron, and less often, oxygen, nitrogen and sulfur. Ceramics are characterized by being hard and abrasion resistant. Examples of such ceramics include aluminum dioxide, berilium oxide, titanium dioxide, titanium boride, boron carbide, silicon nitride, and pyrolytic graphite. Selectively, other elements may be added to a ceramic to optimize its characteristics in use. Titanium carbide is mixed with alloy steels to form a preferred cermet sold under the registered trademark Ferro-tic. Although the piston and sleeve need not be entirely constructed of ceramic or cermet, they should at least have a surface layer deposited in some manner on the working surfaces of the component to prevent galling and provide a low friction surface.

Since the piston and sleeve are of similar material, thermal expansion and contraction is not a problem. As the sleeve and piston grow or contract thermodynamically, the relatively large gap 66 is sufficient to accept changes. If, for example, this sleeve with its small clearance seal was mounted directly to the piston head, piston head contraction during low temperature operation would cause the piston to bind within the sleeve and the sleeve to crack. This problem has previously limited how narrow a clearance seal could be constructed and therefore limited its effectiveness. The small clearance seal herein described would not have been possible without the freedom of movement provided by the floating sleeve.

It should be noted that any distortion of the casing or piston housing 35 caused by external movement or minor damage will not effect the piston and sleeve arrangement due to the ability of the floating sleeve to absorb slight distortions of the housing. Also, the oscillating movement of the crank arm relative to the piston can cause side forces which are absorbed by the floating sleeve.

The clearance seal arrangement shown here might also be utilized on a displacer, to make sure that the gas flow occurrs primarily within the regenerator.

Use of a cermet clearance seal element riding against a pure ceramic clearance seal element has been found to be particularly advantageous. Any debris which is generated from the ceramic is collected in the softer metal of the cermet. The ceramics in the two clearance seal elements still provide very hard surfaces of greater than 60 on the Rockwell C scale which is desirable for the clearance seal elements. Further, the ceramic in the two clearance seal elements eliminates galling. The cermet has an advantage over the ceramic in that it is more readily machined so the more complex of the two elements should be formed of cermet. In the present case, the piston is cermet.

Seals 68 and 70 cushion the ceramic sleeve and prevent gas blow-by between the work space 18 and the dead space 19 behind the piston. Seal 70 may be considered optional as seal 68 would be adequate to prevent gas blow-by, however, in certain situations seal 70 is useful to minimize the volume of dead space gas. Gasket 72 prevents the sleeve from chattering against surface 76 of the cylinder head and elastically accepts any slack between the cylinder head and sleeve.

The connecting rod 44 powers the piston through a wrist pin 48 which is force fitted and tightly bound to the rod 44 through a pinhole in the piston 36. A helium lubricated sleeve bearing is formed between the wrist pin 48 and the piston 36 at surface 74 to allow for the oscillation of the rod relative to the piston. Sufficient clearance space is provided between the piston and the pin so that pressurized helium gas from the clearance seal 67 flows past the wrist pin and enters into the gap 76 between the connecting rod and the piston head. This clearance space between the wrist pin and the piston is about $2 \times 10^{-4}$ inches. Spacers 60 prevent the piston from shifting from side to side on the wrist pin. The spacers are preferably constructed of tool steel or glass filled teflon and are about 0.010 inches thick. A gap of 0.006 to 0.003 inches remains between the piston and the spacers to permit passage of helium gas to dead space area 19.

In the compressor, the clearance seal 67 may be considered a fluid resistance retarding the flow of gas between the work space 18 and dead space 19. Therefore, because of the near sinusoidal variation in work space pressure, there is a reversing pressure drop across the length of the seal 67, both above and below the wrist pin. A reversing pressure drop is also created across the small clearances of the wrist pin bearing 74 which forces lubricating helium gas through the pin bearing. The pressurized gas flow passing the wrist pin bearing 74 lubricates it to reduce friction and wear. The section of the clearance seal 67 between the groove 64 and backspace 19 is most important since without this fluid resistance, the wristpin bearing 74 would assume the pressure of the backspace 19 along its entire length. Without a pressure differential along the length of the pin, there would be no fluid flow along the pin for proper lubrication of the bearing 74. It should be noted that since helium has a very small gas molecule, the small clearance spaces provided for it in the piston are more than adequate to provide for a steady stream of gas to lubricate the wrist pin.

The wrist pin 48 is also constructed of a hardened material such as cermet. Since the piston is constructed of a hardened material such as cermet, the contacting surfaces of the piston and wrist pin 74 are resistant to galling.

Galling occurs when friction between moving parts is sufficiently high and the surface strength of those parts is sufficiently low to allow local high spots in the metal to score and weld adjoining surfaces. Using cermet type material provides a hard finish which is resistant to galling. With the close fitting wrist pin having a $2 \times 10^{31\ 4}$ inch clearance with the piston, the contact stresses are sufficiently low to prevent frictional damage when the wrist pin is lubricated by helium gas. The helium gas cools the surface of the pin and keeps the coefficient of friction low. The spacers 60 are also lubricated by the helium flow and are resistant to rubbing from the connecting rod and piston during operation. In both FIGS. 1 and 2 there is shown pressure equalization groove 64. This groove tends to equalize pressure around the piston so that the flow of helium gas past the wrist pin will not affect the position of the piston in the sleeve.

The use of a helium lubricated wrist pin has several advantages over other types of bearings that have been previously utilized for the same purpose. In the type of compressor described herein, caged bearings are generally too large and sleeve bearings are generally too fragile. It is, therefore, common in small compressors to use a full complement needle bearing between the wrist pin and piston. Grease packed needle bearings tend to generate high frequency noise from roller movement within the bearing. The rollers tend to rap against each other and the wrist pin. Further, grease from the greasedfilled bearing can escape into the helium environment. Such contamination can lead to a degradation in refrigerator efficiency. These problems are avoided by the helium lubricated wrist pin which is almost noiseless and from which there is virtually no chance of contamination. It should also be noted that the lubricated wrist pin would also have these same advantages in a Stirling engine piston.

Rubber gasket 72 and gaskets 68 and 70 tend to isolate the sleeve and reciprocating piston from the piston housing 35. This further reduces the high frequency noise produced by the reciprocating piston 36. Further, the gasket reduces fluctuation in pressure differentials across the O-ring 68 and thereby reduces wear of the O-ring.

Figure 3:
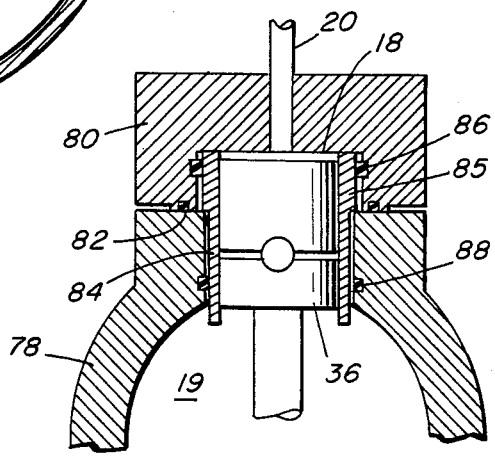
FIG. 3 is the cross section of a cylinder head and sleeve disclosing another embodiment of the invention.

FIG. 3 is the cross section of the cylinder head similar to the cylinder head shown in FIG. 2 except that it discloses a different embodiment of the invention. In this embodiment a two piece piston head 78 and 80 is assembled together with indium seal 82. When the head casings are assembled, a shoulder 85 of a sleeve 84 is loosely trapped into position.

The ceramic sleeve 84 acts in much the same way as the sleeve described in connection with FIG. 2. A very small clearance is provided between the cermet piston 36 and the sleeve 84 while a large gap is left between it and the housings 78, 80. Two seals 86 and 88 serve to prevent gas blow-by between the working space 18 and the back space 19. This gas blow-by would occur if the gas path between the sleeve and the piston were left open. Seal 88 also limits the size of the dead space volume 19.

In addition to the advantages of tight clearance seals noted in the previous embodiment, an advantage of this embodiment stems from the extension of the clearance seal itself. The piston sleeve 84 extends downward from the lower piston head 78, to extend the axial length of the clearance seal. During a large portion of the piston stroke, the clearance seal is formed using the entire piston. The longer the axial length of such a seal, the more effective it is and the less leakage it permits.

A further advantage of this embodiment is the ease of assembly permitted by the use of a two part cylinder head. Two part cylinder heads with clearance seals would be very difficult to machine without a floating sleeve. This is true because the strict dimensioning required by clearance seals presents substantial alignment problems for any two piece assembly. Tight clearance seals in a two piece assembly would, if minutely misassembled, cause the piston to bind. In this embodiment any slight misalignment is absorbed by the gap between the clearance seal and the piston head without affecting piston operation.

Figure 4:
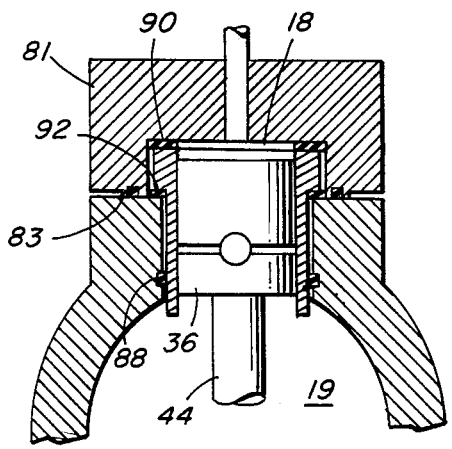
FIG. 4 is a cross section of a cylinder head and sleeve disclosing an embodiment of the invention optimized particularly for compressor noise reduction.

FIG. 4 presents an embodiment of this invention that has been especially optimized for noise reduction. Reciprocating pistons of the type described herein tend to produce high frequency noise. The piston and sleeve arrangement in FIG. 4 isolates the piston and sleeve from the cylinder head in a manner which attenuates noise.

The cylinder head is made of two sections 79 and 81 which are joined with an indium seal 83. The indium seal prevents escape of the working fluid from the compressor. Gaskets 90 and 92 isolate the sleeve and its vibrations and noise from the cylinder head. Seal 88 prevents gas blow by and reduces the size of the dead space. Rubber sandwiches formed by gaskets 90 and 92 produce a 50% reduction of noise in the 500 to 4000 hertz range as compared to a compressor piston with integral sleeves. In addition, the bearing between the connecting rod 48 and the cam shaft may also be cushioned with a rubber sandwich which would further reduce high frequency noise. A preferred material for noise attenuating gaskets is 80 90 duro polyurethane rubber.

In most respects, this seal embodiment is quite similar to that discussed in relation to FIG. 3. A large gap exists between the cylinder head and the ceramic sleeve, while a very small clearance exists between the cermet piston and the sleeve. The sleeve itself is allowed to float somewhat within the cylinder head and thereby makes up for any discrepancies due to thermal changes or misalignment of the two cylinder head pieces.

While the invention has been particularly shown and described with reference to the preferred embodiments thereof, it will be understood by those who are skilled in the art that there are changes in form and detail that may be made without departing from the spirit and scope of the invention as defined by the appended claims.

I claim:

1. In a cryogenic refrigerator, an assembly comprising:
    a piston housing;
    a sleeve positioned to float within said housing and having a flexible seal between the sleeve and housing to permit transverse movement relative to the housing, the sleeve comprising ceramic and being a substantial peak to peak pressure variation at one end of the sleeve and a relatively constant pressure at the other end of the sleeve; and
    a piston comprising ceramic positioned within said sleeve for axial reciprocation.

2. The cryogenic refrigerator of claim 1 wherein the sleeve is retained in the piston housing by means of a snap ring.

3. The cryogenic refrigerator assembly of claim 1 wherein the piston housing is comprised of two pieces and the sleeve is trapped in position by the assembly of the two piece piston housing.

4. The cryogenic refrigerator of claim 1 wherein said piston positioned within said sleeve has an outer diameter within 0.005 inches of the inner diameter of the sleeve.

5. The cryogenic refrigerator of claim 1 wherein the ceramic material of the piston is cermet.

6. The cryogenic refrigerator of claim 1 wherein the piston is driven by a rotary drive motor.

7. In a cryogenic refrigerator, a compressor piston assembly comprising:
    a two piece housing with a seal between the two pieces of the housing;
    a sleeve comprising ceramic, loosely retained in positioned by the assembly of the two pieces of the housing;
    a piston comprising ceramic for axial reciprocation within said sleeve, wherein the piston forms with one of said pieces of the housing a substantially closed work space for the compression of gas and wherein the other piece of the housing is open to allow connection of drive means to the piston;
    a clearance seal between said piston and said sleeve; and
    an elastic seal to prevent gas leakage between said sleeve and housing from said work space.

8. A helium cryogenic refrigerator of the type comprising a reciprocating displacer within a refrigerator cylinder, the displacer being driven in a reciprocating motion by the pressure differential between helium gas in the refrigerator cylinder and gas in a gas spring volume, the refrigerator cylinder being in fluid communication with a compressor space in a compressor cylinder, the compressor space and the refrigerator cylinder defining a closed working volume of helium gas which is compressed and expanded by a piston in the compressor housing;
    the refrigerator further comprising a fluid seal between the ends of the compressor piston which is a low friction clearance seal between a hard, smooth wall of a floating sleeve loosely positioned within the compressor housing and a hard, smooth piston wall to permit transverse movement relative to the housing.

9. A refrigerator as claimed in claim 8 wherein the radial clearance between the sleeve and piston is less than $1 \times 10^{-4}$ inches.

10. A refrigerator as claimed in claim 8 wherein the sleeve comprises ceramic material.

11. A refrigerator as claimed in claim 10 wherein the piston is comprised of cermet.

12. The cryogenic refrigerator of claim 8 wherein a crank mechanism is connected to the piston for oscillatory movement by means of a ceramic wrist pin, said pin forming a sleeve bearing and being lubricated by helium gas.

* * * * *

UNITED STATES PATENT AND TRADEMARK OFFICE
CERTIFICATE OF CORRECTION

PATENT NO. : 4,574,591
DATED      : Mar. 11, 1986
INVENTOR(S) : Peter K. Bertsch It is certified that error appears in the above—identified patent and that said Letters Patent is hereby corrected as shown below:

In column 5, line 44, change "$10^{31\ 4}$" to --$10^{-4}$--.
In column 7, line 28, after "and" insert --there--.
In column 8, line 32, after "sleeve" insert a comma --,--;
at line 33, after "housing" insert --to permit transverse movement relative to the housing,--; and in lines 34 and 35 delete "to permit transverse movement relative to the housing".

Signed and Sealed this

Nineteenth Day of August 1986

[SEAL]

Attest:

Attesting Officer

DONALD J. QUIGG

Commissioner of Patents and Trademarks